(12) United States Patent
Hsu et al.

(10) Patent No.: US 8,033,592 B2
(45) Date of Patent: Oct. 11, 2011

(54) DOOR ASSEMBLY AND METHOD FOR A VEHICLE

(75) Inventors: Chih-Cheng Hsu, Rochester Hills, MI (US); Albert H. Butlin, Beverly Hills, MI (US); John E. Carsley, Clinton Township, MI (US); Hui-Min Huang, Novi, MI (US); Stephen R. Koshorek, Royal Oak, MI (US); John N. Owens, Franklin, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 240 days.

(21) Appl. No.: 12/199,136

(22) Filed: Aug. 27, 2008

(65) Prior Publication Data

US 2010/0052360 A1 Mar. 4, 2010

(51) Int. Cl.
*B60J 5/04* (2006.01)
(52) U.S. Cl. ............... 296/146.6; 296/146.5; 49/502
(58) Field of Classification Search ............. 296/146.6, 296/146.5, 187.03; 49/501, 502
See application file for complete search history.

(56) References Cited

U.S. PATENT DOCUMENTS

| 4,306,381 | A | * | 12/1981 | Presto | ............................. 49/502 |
| 4,434,580 | A | * | 3/1984 | Engelsberger et al. | ......... 49/502 |
| 5,536,060 | A | * | 7/1996 | Rashid et al. | ............... 296/146.6 |
| 6,220,652 | B1 | | 4/2001 | Browne et al. | |
| 7,331,626 | B2 | * | 2/2008 | Yoshimoto et al. | ...... 296/187.12 |

* cited by examiner

*Primary Examiner* — Glenn Dayoan
*Assistant Examiner* — Melissa A Black
(74) *Attorney, Agent, or Firm* — Quinn Law Group, PLLC

(57) ABSTRACT

A door assembly for a vehicle includes an outer panel. A support panel is operatively connected to the outer panel and configured such that the support panel provides bending resistance to the outer panel when the outer panel is deflected toward the support panel during a first deflection distance of the outer panel. A cable is operatively connected in the door assembly between a first end and a second end of the outer panel such that the cable provides additional bending resistance to the outer panel when the outer panel is deflected toward the support panel during a second deflection distance of the outer panel, greater than the first deflection distance.

15 Claims, 5 Drawing Sheets

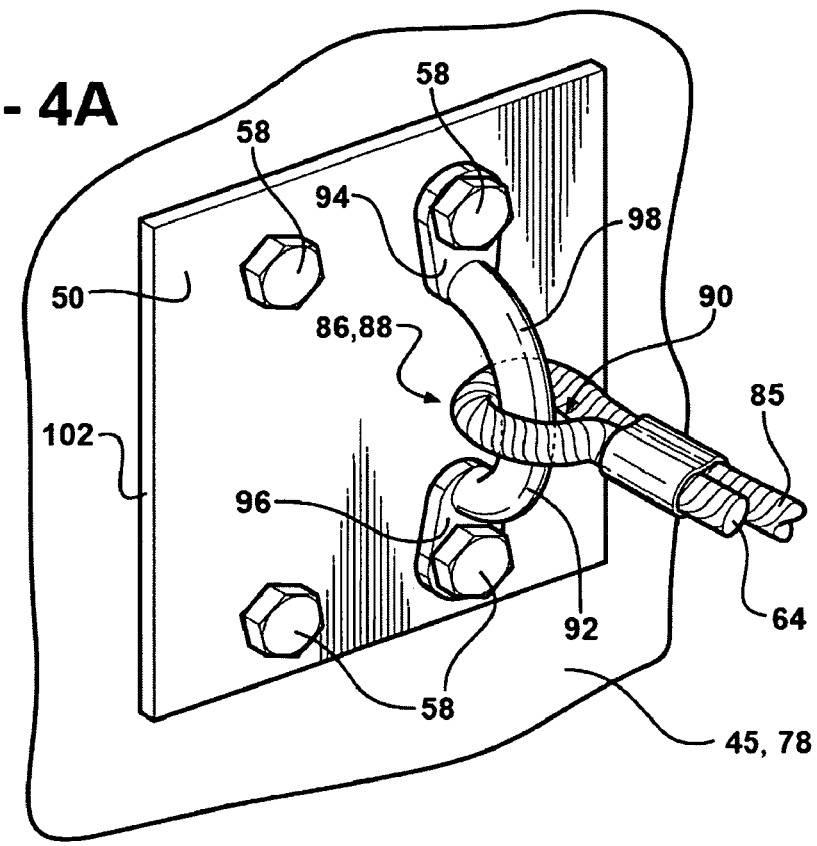
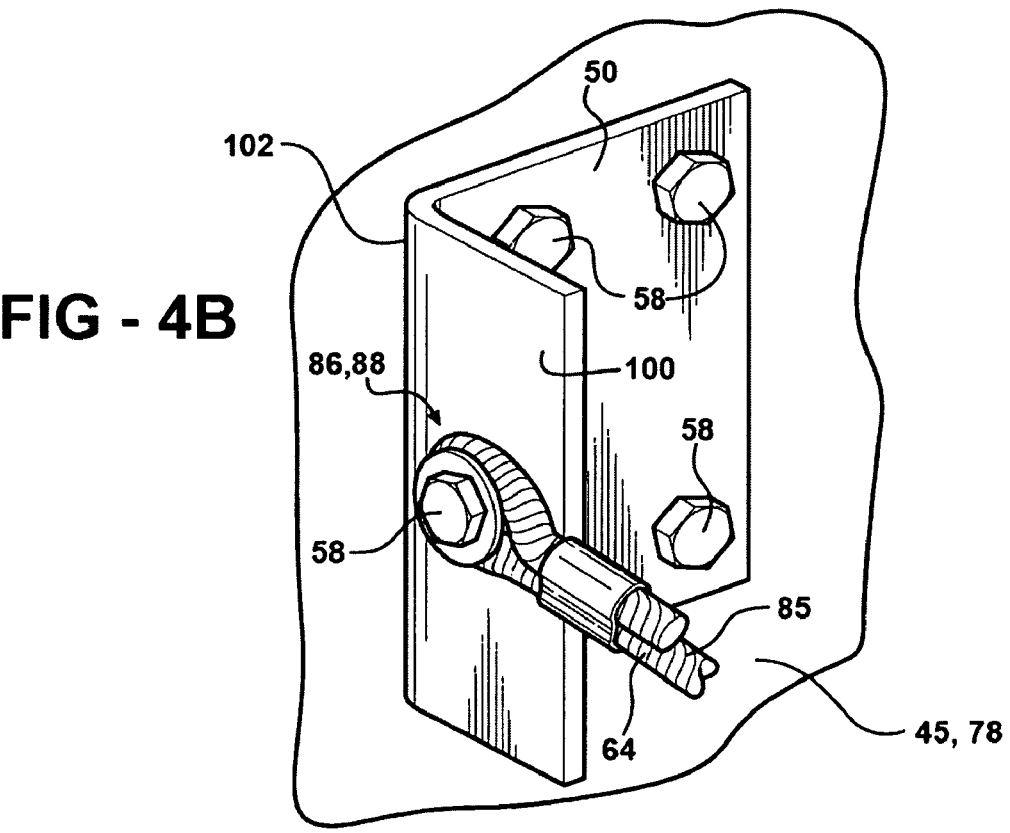

DOOR ASSEMBLY AND METHOD FOR A VEHICLE

TECHNICAL FIELD

The present invention relates to a reinforcement system for a door assembly of a vehicle.

BACKGROUND OF THE INVENTION

A typical door assembly of a vehicle extends between a front end and a rear end. The door assembly includes an outer panel and an inner panel. The outer panel is attached to the inner panel at the front and rear ends of the door assembly to define a door cavity there between. An intrusion beam or panel is disposed within the door cavity and extends between the front and rear ends. The intrusion beam is typically formed from steel. The intrusion beam is operative to provide energy absorption through bending resistance to the door assembly in an impact event as the outer panel is deflected toward the inner panel.

SUMMARY OF THE INVENTION

This invention provides an efficient, lightweight solution for door stiffness and bending resistance in a vehicle door. Thus, a door assembly for a vehicle includes a door shell extending between a front end and a rear end. The door shell includes an outer panel presenting an interior surface opposing an exterior surface and an inner panel operatively connected to the outer panel. A support panel is disposed between the outer panel and the inner panel and presents a first surface opposing a second surface. The first surface of the support panel faces the interior surface of the outer panel such that the support panel provides bending resistance to the outer panel when the outer panel is deflected toward the inner panel. A cable is operatively connected to at least one of the support panel and the door shell, wherein the cable extends between the front end and the rear end of the door shell such that the cable provides additional resistance to movement of the outer panel when the outer panel is deflected toward the inner panel.

A method of reinforcing a door assembly of a vehicle includes attaching a support panel to a door shell of the door assembly to provide bending resistance to the door assembly as the outer panel is deflected toward the inner panel a first distance. A cable is attached between a front end and a rear end of the door shell of the door assembly to provide additional resistance to movement of the door assembly as the outer panel is deflected toward the inner panel a second distance, beyond the first distance.

A reinforcement system for a door assembly of a vehicle having a door shell includes an outer panel presenting an interior surface opposing an exterior surface and an inner panel operatively connects to the outer panel. The support panel presents a first surface opposing a second surface. The support panel is for operative connection to the door shell such that the first surface of the support panel faces the interior surface of the outer panel and the support panel provides bending resistance to the outer panel when the outer panel of the door assembly is deflected toward the inner panel. A cable is for operative connection to the door shell and/or the support panel such that the cable provides additional resistance to movement of the outer panel when the outer panel is deflected toward the inner panel.

Accordingly, a lightweight door assembly may be provided by combining a composite support panel and a cable in the door assembly. In addition to being lightweight, the combination of the support panel and the cable assembly provides bending resistance and intrusion resistance to the door assembly as the outer panel is deflected.

The above features and advantages and other features and advantages of the present invention are readily apparent from the following detailed description of the best modes for carrying out the invention when taken in connection with the accompanying drawings.

BRIEF DESCRIPTION OF THE DRAWINGS

Referring now to the figures, which are exemplary embodiments and wherein like elements are numbered alike:

FIG. 4A is a partial perspective view of a hinge/latch plate of the reinforcement system with an additional bracket to connect the reinforcement system to the door assembly;

FIG. 4B is a partial perspective view of an alternative embodiment of the hinge/latch plate of the door assembly without the additional brackets.

DESCRIPTION OF THE PREFERRED EMBODIMENTS

Figure 1:
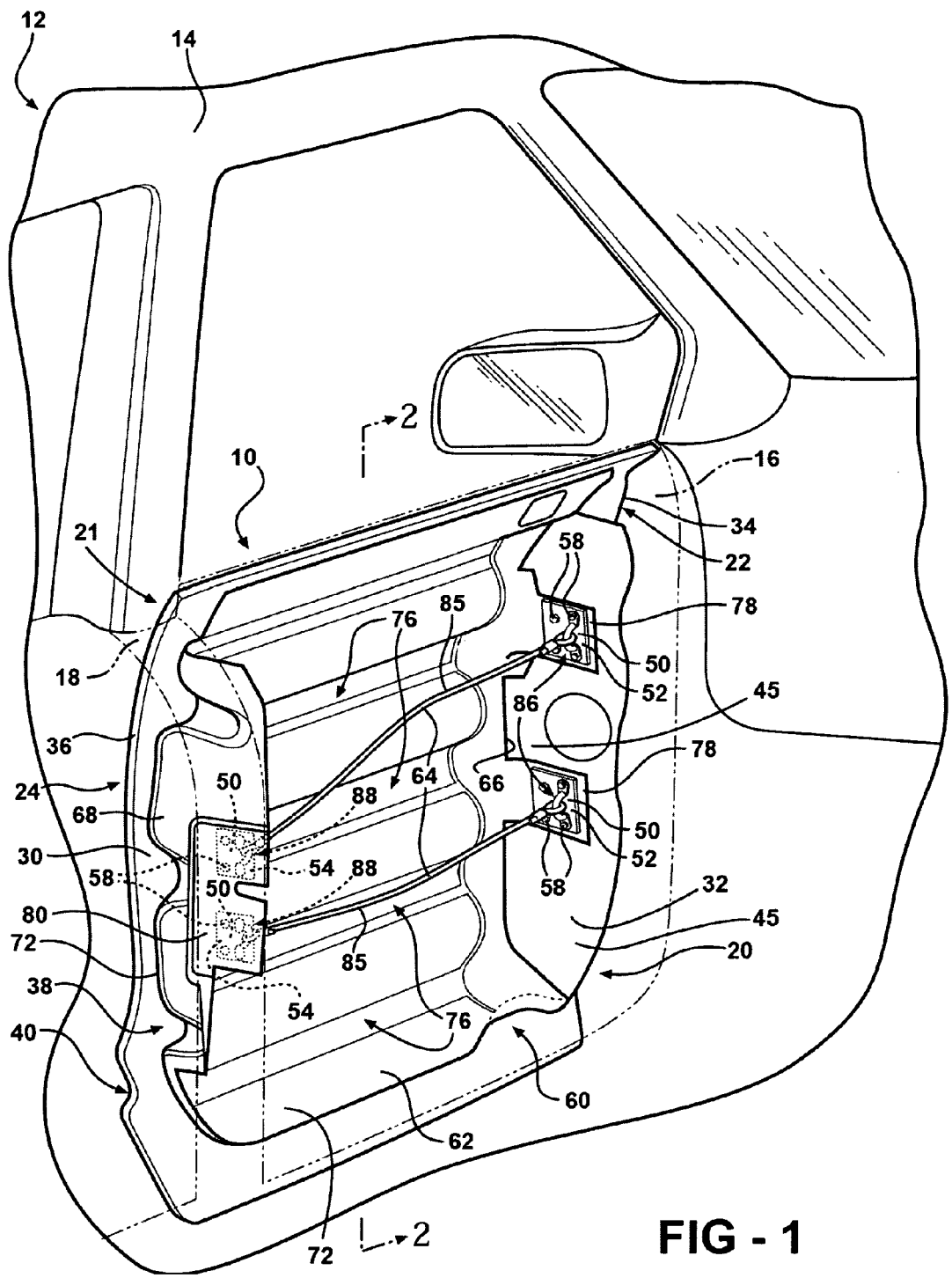
FIG. 1 is a partial perspective view of a vehicle having a door assembly with an inner door panel cut away to show a reinforcement system connected to a support panel.

Referring to the drawings, wherein like reference numbers refer to like components, FIG. 1 shows a door assembly 10 for a vehicle 12. The vehicle 12 includes a body 14 with a forward and a rearward pillar 16, 18, respectively. Each of the pillars 16, 18 each vertically, in spaced and generally parallel relationship to one another, and define an opening 20 there between. The door assembly 10 includes a door shell 21 that extends between a front end 22 and a rear end 24. A hinge assembly (not shown) pivotally attaches the front end 22 of the door assembly 10 to the forward pillar 16 of the body 14 such that the door assembly 10 is operatively connected to pivot relative to the forward pillar 16. A latch (not shown) extends from the rear end 24 of the door assembly 10 and a striker (not shown) extends from the rearward pillar 18. The latch is configured to selectively engage the striker to latch the door assembly 10 to the rearward pillar when the door assembly 10 is pivoted relative to the forward pillar 16 and across the opening 20.

Figure 2:
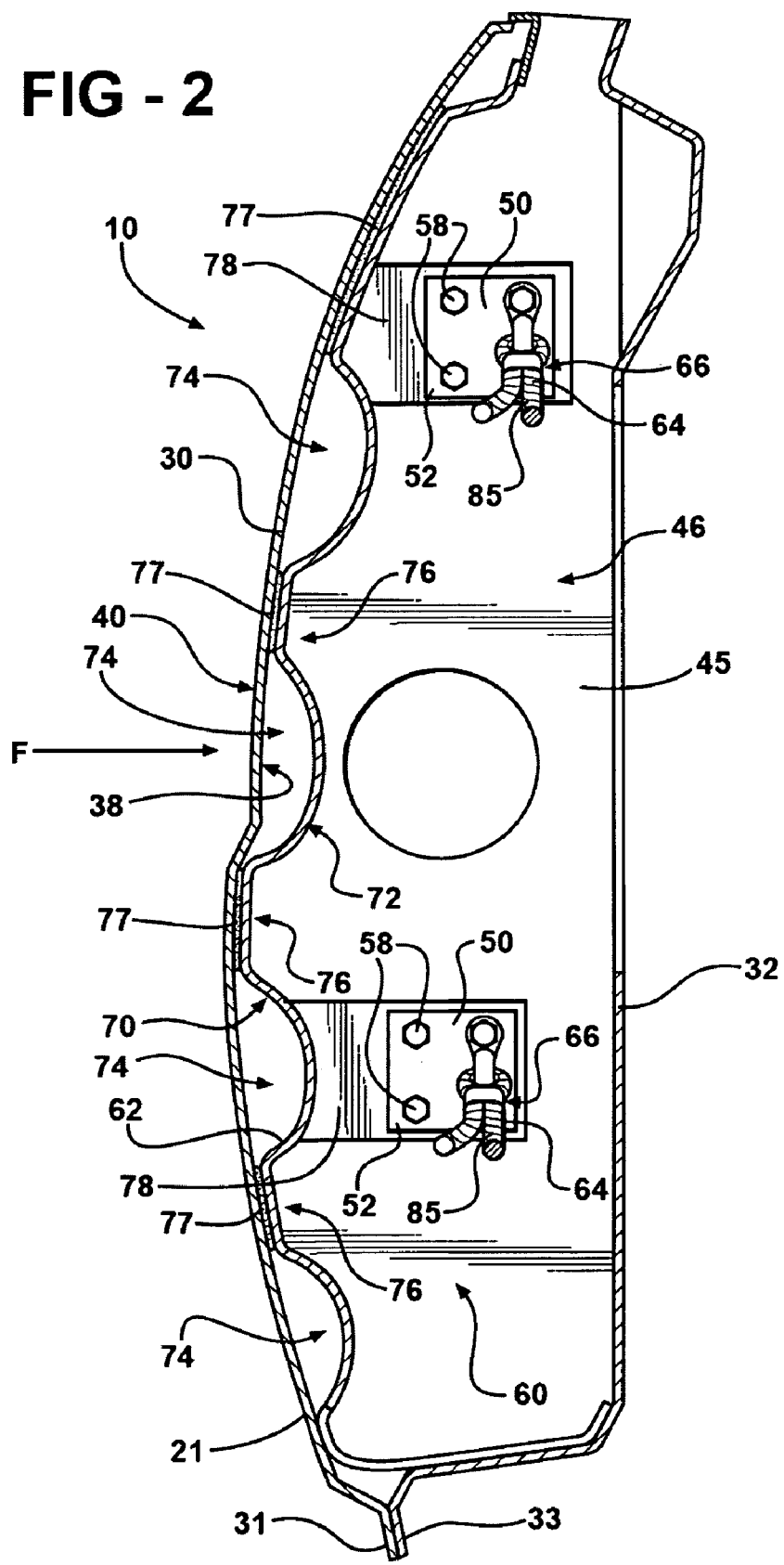
FIG. 2 is a cross-sectional end view of the door assembly of FIG. 1.
Figure 3:
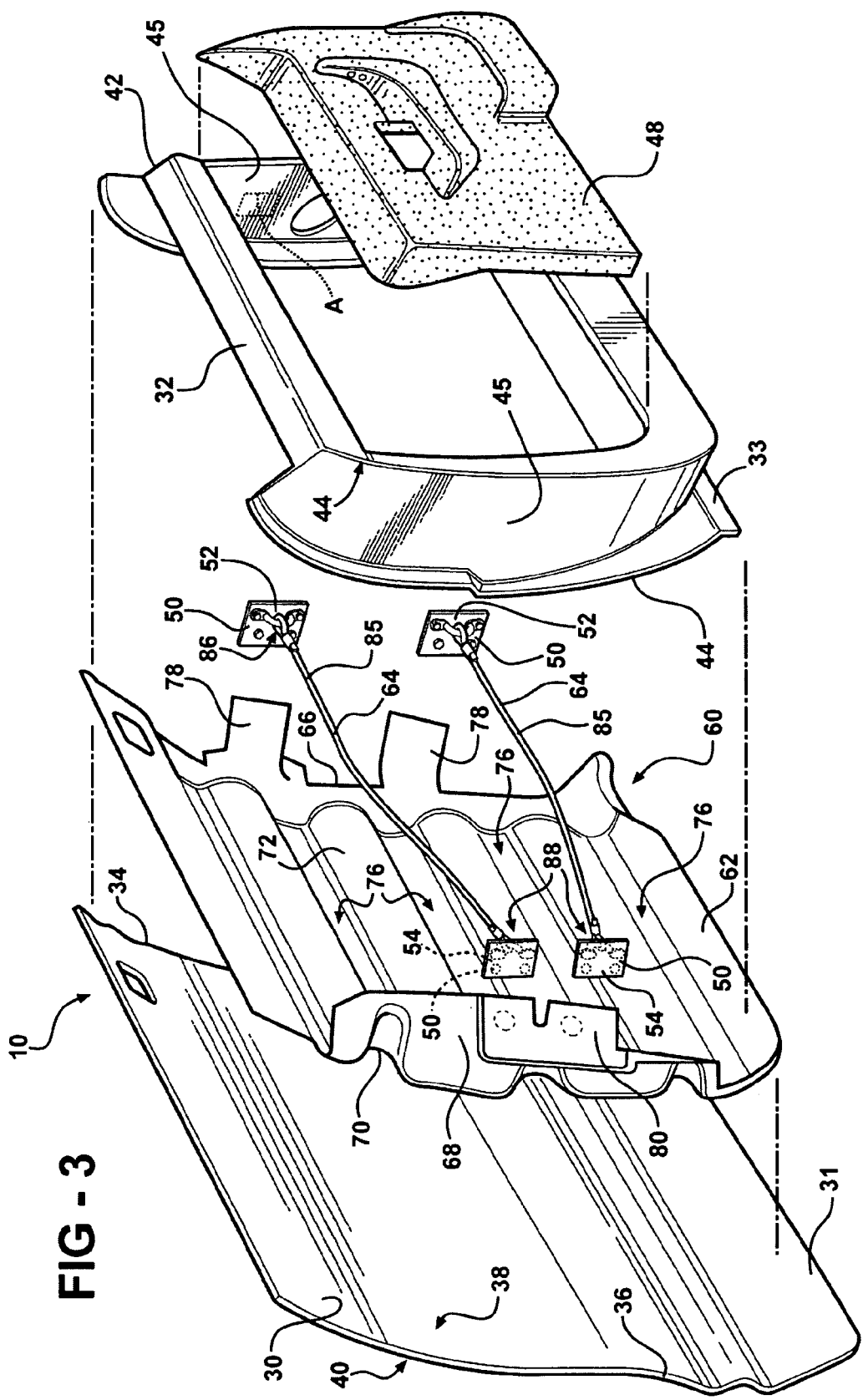
FIG. 3 is an exploded perspective view of the door assembly of FIG. 1 with the reinforcement system of this invention selectively positioned for/or connected to the inner door panel or the support panel.

Referring also to FIGS. 2 and 3, the door shell 21 includes an outer panel 30 and an inner panel 32. The outer panel 30 may be stamped from aluminum, molded from plastic, or formed with any lightweight material that provides a class-A exterior surface 40 with dent resistance to the outer panel 30. The outer panel 30 is generally contoured and extends between an outer front edge 34 and an outer rear edge 36. The outer panel 30 presents an interior surface 38 that opposes the exterior surface 40. The inner panel 32 is also generally contoured and includes a pair of sidewalls 45 which extend from an inner front edge 42 and an inner rear edge 44, respectively. The door assembly 10 may be formed by mating the inner front edge 42 of the inner panel 32 with the outer front edge 34 of the outer panel 30, at the front end 22 of door assembly 10, and the inner rear edge 44 of the inner panel 32 with the outer rear edge 36 of the outer panel 30, at the rear end 24 of the door assembly 10. Lower edges 31, 33 of the outer and inner panels 30, 32, respectively, may also be operatively mated. An internal cavity 46 is defined between the mated outer and inner panels 30, 32 to substantially enclose a support panel 62. The outer and inner panels 30, 32 may be mated via welding and the like. A trim cover 48 may optionally be disposed over the inner panel 32.

The door assembly 10 also includes a plurality of plates 50, as shown in FIGS. 1-3, 4A, and 4B. Such plates 50 may be metal reinforcement plates, likely at the hinge and latch locations, to transfer loads between the vehicle structure and the door structure. Referring specifically to FIGS. 1-3, the plates 50 may be a hinge plate 52 that is operatively attached to at least one of the inner and support panels 32, 62 at the front end 22 of the respective outer and/or inner panel 30, 32. In one embodiment, the hinge plate 52 may be attached to the side wall 45 of the inner panel 32, such as at A in phantom in FIG. 3, at the front end 22 of the door shell 21, whereby to provide reinforcement to a hinge assembly. Referring specifically to FIGS. 1 and 3, the plate 50 may be a latch plate 54 that is operatively attached to at least one of the inner and support panels 32, 62, at the rear end 24 of the door assembly 10. This means that the hinge plate 52 may be in spaced relationship, across the internal cavity 46, to the latch plate 54. In one embodiment, shown in FIG. 1 the latch plate 54 may be attached to the support panel 62 and/or the sidewall 45 of the inner panel 32, at the rear end 24 of the door shell 21, and the latch to provide reinforcement to the latch. The plates 50 are generally flat and may be formed from steel or any other materials known to those skilled in the art. The plates 50 may define a plurality of attachment holes for attachment of the plates 50 to at least one of the outer, inner, and/or support panels 30, 32, 62 with fasteners 58. It should be appreciated, however, that the plates 50 may be attached to the respective sidewall 45 of the inner panel 32 using any other method known to those skilled in the art.

Referring to FIGS. 1-3, the door assembly 10 also includes a reinforcement system 60 that is disposed within the internal cavity 46 of the door shell 21. The reinforcement system 60 includes a support panel 62 and at least one cable assembly 64, which is attached at the hinge and latch locations of the door shell 21. The support panel 62 is a composite panel of improved mass benefit which is formed as a molded carbon-fiber or glass-fiber corrugated structure that provides structural rigidity with integrated performance of an intrusion beam at the outer beltline reinforcement. Such a fiber composite construction can provide efficient energy absorption through bending resistance for the initial deflection. The support panel 62 extends between a first end 66 and a second end 68 and has a first side or surface 70 opposing a second side or surface 72. The support panel 62 is disposed within the internal cavity 46 such that the support panel 62 is disposed between the outer front edge 34 and the outer rear edge 36 of the outer panel 30 and the first side 70 of the support panel 62 faces the interior surface 38 of the outer panel 30. A plurality of first grooves 74 are defined in the first side 70 and a plurality of second grooves 76 are defined in the second side 72 of the support panel 62. This means that each of the grooves 74, 76 extends in parallel relationship to one another. The first grooves 74 extend in alternating relationship to the second grooves 76 such that the support panel 62 is corrugated, i.e., wavy, which may provide additional structural rigidity to the support panel 62. In one embodiment, shown in FIG. 2, the grooves 74, 76 are formed as a U-shape. It should be appreciated, however, that the grooves 74, 76 may be formed into any other desired shape known to those skilled in the art. In one embodiment, shown in FIG. 2, the support panel 62 is adhered directly to the outer panel 30 to provide added strength to the door assembly 10. The support panel 62 is attached or adhered in an operative connection to the outer panel 30 using a structural adhesive 77, fasteners, or any other attachment method known to those skilled in the art. The outer panel 30 may contribute to the door structure when it is bonded in place with the structural adhesive 77.

In another embodiment, the support panel 62 may also include at least one front tab 78 extending generally perpendicularly from the first end 66 and at least one rear tab 80 extending generally perpendicularly from the second end 68, as shown in FIGS. 1-3. In this embodiment, the front tab 78 is attached to the door assembly 10 at the front end 22 and the rear tab 80 is attached to the door assembly 10 at the rear end 24. In one embodiment, FIG. 1, the support panel 62 may be attached to the door assembly 10 via the hinge plates 52 and latch plate 54 at the respective front and rear tabs 78, 80. Thus, in addition to attaching a cable assembly 64 to the support panel 62 and/or the inner panel 32, it should be appreciated that the support panel 62 may also be attached in the door assembly 10 using any other method known to those skilled in the art that provides an operative connection between the panel support panel 62 and/or the door shell 21.

Figure 5:
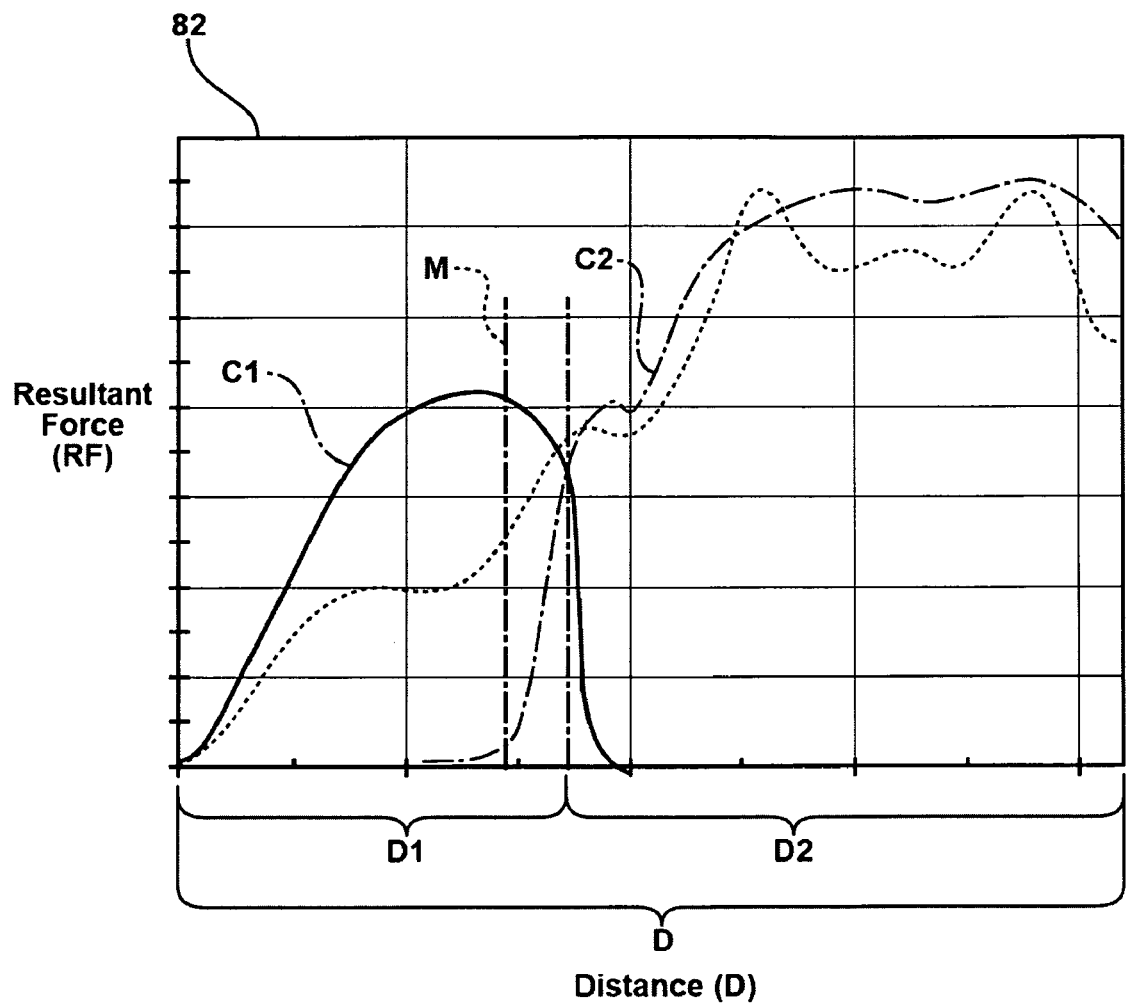
FIG. 5 is a chart illustrating deflection distance versus resultant force for the reinforcement system of the door assembly of this invention.

Referring to FIG. 5, a deflection curve 82 is shown, which represents a deflection distance D of the outer panel 30 toward the inner panel 32 when a force F is applied to the outer panel 30 and a resultant force RF that corresponds to the deflection distance D. The composite structure of the support panel 62 provides a lightweight support panel 62 while also providing energy absorption through bending resistance up to approximately six inches of deflection. As the outer panel 30 is deflected toward the inner panel 32, the support panel 62 is also deflected toward the inner panel 32. The support panel 62 provides a predetermined amount of bending resistance to the deflection of the outer panel 30 toward the inner panel 32 during the first six inches of the deflection, i.e., a first deflection distance D1. This resistance is represented by a first curve C1 in FIG. 5. As the outer panel 30 and the support panel 62 are deflected toward the inner panel 32, the resultant force RF absorbed by the support panel 62 reaches a maximum bending limit M. After the maximum bending limit M is reached, the support panel 62 yields or breaks and the resultant force RF absorbed by the support panel 62 decreases rapidly as the deflection continues. Typically, the maximum bending limit M is prior to the first deflection distance D1. It should be appreciated, however, the first deflection distance D1 is not limited to being after the maximum bending limit M is reached. The first deflection distance D1 can also be at, or before, the maximum bending limit M is reached. In addition, the first deflection distance D1 is not limited to being six inches, as the support panel 62 may be designed to have any other predetermined first deflection distance D1.

Referring again to FIG. 1, the cable assembly 64 of the reinforcement system 60 is operatively connected to the door assembly 10 such that the cable assembly 64 extends between the front end 22 and the rear end 24 of the door assembly 10. It should be appreciated that while two cable assemblies 64 are shown in the Figures, any number of cable assemblies 64 may be used as known to those skilled in the art. Each cable assembly 64 includes a cable 85 that extends between a first and a second attachment end 86, 88. The cable 85 is formed to have high tensile strength. Therefore, the cable 85 may be formed from aramid fibers (e.g., Kevlar® and the like), steel, braided fibers, or any other high tensile strength material known to those skilled in the art. The first attachment end 86 is operatively connected to the front end 22 of the door assembly 10 and the second attachment end 88 is operatively connected to the rear end 24 of the door assembly 10. In one embodiment, the first attachment end 86 is operatively connected to the front end 22 of the door assembly 10 at the hinge plate 52 and the second attachment end 88 is operatively connected to the rear end 24 of the door assembly 10 at the latch plate 54. Each attachment end 86, 88 may be looped and clamped to define a thru-hole 90 for attachment to the door assembly 10 with one of the fasteners 58, as shown in FIGS. 4A and 4B. However, other attachment ends 86, 88 may be used as known to those skilled in the art.

In one embodiment, the attachment ends 86, 88 are connected to the respective ends of the door assembly 10 using a bracket 92, as shown in FIG. 4A. The bracket 92 extends between a first and second attachment point 94, 96 and has an arched section 98 that extends between the attachment points 94, 96. The bracket 92 is threaded through the thru-hole 90 of a respective attachment end 86, 88 of the cable 85 and the bracket 92 is attached or fastened to the door assembly 10 and/or the plate to retain the cable assembly 64 at the respective ends 22, 24 or locations of the door assembly 10.

In another embodiment for attaching the attachment ends 86, 88 of the cable 85 to the door assembly 10, a bent-over segment 100 extends from an edge 102 of the plate 50, as shown in FIG. 4B. The segment 100 may be generally flat and define a fastening hole. The attachment end 86, 88 of the cable 85 may be attached to the segment 100 with a fastener 58 that extends through the thru-hole 90 of one of the attachment ends 86, 88 of the cable assembly 64 to retain the cable assembly 64 to the respective end 22, 24 of the door assembly 10. It should be appreciated that the attachment ends 86, 88 and the plates 50 are not limited to that which is described, but any other configuration may be used as known to those skilled in the art.

When the cable assembly 64 is attached to the door assembly 10, the cable 85 is preferably slack, i.e., not in tension, as shown in FIG. 1. This allows the cable 85 to become engaged, i.e., in tension, at or about the time that the support panel 62 is at the first deflection distance D1. Therefore, after the first deflection distance D1 is reached, the cable 85 becomes in tension to provide tensile resistance to the further deflection of the door assembly 10 after the first six inches of deflection to approximately twelve inches of deflection or more, i.e., across a second deflection distance D2. Referring again to FIG. 5, this tensile resistance is represented by a second curve C2. The cable 85 becomes in tension at approximately the same time that the support panel 62 is no longer able to provide additional bending resistance to the deflecting outer panel 30 in the door assembly 10, as the outer panel 30 is deflected toward the support panel 62, i.e., at the first deflection distance D1. When the cable 85 of the cable assembly 64 is then in tension, the tension of the cable 85 causes the forward and rearward pillars 16, 18 of the vehicle 12 to become engaged to absorb energy over the second deflection distance D2. Typically, the second deflection distance D2 is between six and eighteen inches of deflection of the outer panel 30. This means that the cable assembly 64 absorbs the energy after the time when the support panel 62 is no longer providing the bending resistance. However, it should be appreciated that the second deflection distance D2 is not limited to this range, as the cable assembly 64 may be designed such that the cable 85 is in tension during any other deflection range of the outer panel 30.

The cable assembly 64 may be further attached to the door assembly 10 in additional ways. In one embodiment, cable 85 portions of the assembly 64 may be molded integrally into the support panel 62 with the attachment ends 86, 88 exposed and fastened to the latch and hinge plates 54, 52, respectively, such that there is sufficient slack to engage, i.e., become taut, at the predetermined deflection position for engaging the body pillars 16, 18 in an impact or intrusion event. In another embodiment, the cable assembly 64 is installed as a separate component during door assembly and, may be affixed to the door inner panel 32 or to the support panel 62, i.e., on either side of window glass (not shown), with an appropriate slack. It should be appreciated, however, that with any embodiment, the cable assembly 64 would have to be assembled in such a way as to avoid rattling during operation of the vehicle 12.

While the best modes for carrying out the invention have been described in detail, those familiar with the art to which this invention relates will recognize various alternative designs and embodiments for practicing the invention within the scope of the appended claims.

The invention claimed is:

1. A vehicle comprising:
  a body including a forward pillar and a rearward pillar extending in spaced relationship to said forward pillar;
  wherein said forward pillar and said rearward pillar define an opening therebetween;
  a door assembly pivotally disposed in said opening including;
  a door shell extending between a front end and a rear end, wherein said door shell includes an outer panel presenting an interior surface opposing an exterior surface and an inner panel operatively connected to said outer panel;
  a hinge plate operatively attached to said inner panel, at said front end;
  wherein said front end of said inner panel is pivotally attached to said forward pillar;
  a latch plate operatively attached to said inner panel, at said rear end;
  wherein said latch plate is configured to selectively latch said door assembly to said rearward pillar;
  wherein each of said hinge plate and said latch plate are configured to transfer loads between said door shell and the vehicle;
  a support panel disposed between said outer panel and said inner panel and presenting a first surface opposing a second surface, wherein said first surface of said support panel faces said interior surface of said outer panel;
  wherein said support panel is attached to only said outer panel of said door shell such that said support panel provides bending resistance to said outer panel when said outer panel is deflected toward said inner panel a first deflection distance;
  a cable operatively connected to said front end of said door shell at said hinge plate and said rear end of said door shell at said latch plate, wherein said cable is configured to extend in slack relationship between said front end and said rear end of said door shell when the first deflection distance is reached; and
  wherein said cable is configured to become engaged when the first deflection distance is reached to provide additional resistance to movement of said outer panel when said outer panel is deflected toward said inner panel.

2. A door assembly, as set forth in claim 1, wherein said support panel is a composite structure.

3. A door assembly, as set forth in claim 1, further comprising an adhesive disposed between said interior surface of said outer panel and said first surface of said support panel to adhere said support panel to said outer panel.

4. A door assembly, as set forth in claim 1, wherein said cable is integral to said support panel.

5. A door assembly, as set forth in claim 1, wherein said cable extends between a first attachment end and a second attachment end and said first attachment end and said second attachment end are each operatively connected to said door shell such that said cable provides additional resistance to movement of said outer panel when said outer panel is deflected toward said inner panel.

6. A door assembly, as set forth in claim 5, further comprising a first attachment plate operatively connected to said door shell proximate said front end and a second attachment plate operatively connected to said door shell proximate said rear end, wherein said first attachment end is operatively connected to said first attachment plate and said second attachment end is operatively connected to said second attachment plate.

7. A door assembly, as set forth in claim 1, further comprising a second cable operatively connected to said door shell, wherein said second cable extends between said front end and said rear end of said door shell such that said second cable provides further additional resistance to movement of said outer panel when said outer panel is deflected toward said inner panel.

8. A door assembly, as set forth in claim 1, wherein said support panel defines at least one groove.

9. A door assembly, as set forth in claim 8, wherein said at least one groove is at least one first groove defined in said first surface and at least one second groove defined in said second surface.

10. A door assembly, as set forth in claim 9, wherein said at least one first groove is a plurality of first grooves and said at least one second groove is a plurality of second grooves and said plurality of first and second grooves extend in generally parallel relationship to each other.

11. A door assembly, as set forth in claim 10, wherein said plurality of first grooves are disposed in alternating relationship to said plurality of second grooves such that said support panel is corrugated.

12. A door assembly, as set forth in claim 1, wherein said support panel extends between a first end and a second end and a front tab extends generally perpendicularly from said first end and a rear tab extends generally perpendicularly from said second end wherein said front tab is operatively connected to said door shell at said front end and said rear tab is operatively connected to said door shell at said rear end.

13. A door assembly, as set forth in claim 1, wherein said inner panel extends between an inner front edge, proximate said front end of said door shell, and an inner rear edge, proximate said rear end of said door shell and said outer panel extends between an outer front edge, proximate said front end of said door shell, and an outer rear edge, proximate said rear end of said door shell, wherein said outer front edge of said outer panel is operatively connected to said inner front edge of said inner panel and said outer rear edge of said outer panel is operatively connected to said inner rear edge of said inner panel.

14. A door assembly, as set forth in claim 13, wherein said inner panel includes a first sidewall extending generally perpendicularly from said inner front edge to define said front end of said door shell and a second sidewall extending generally perpendicularly from said inner rear edge of said inner panel to define said rear end of said door shell.

15. A door assembly, as set forth in claim 1, wherein said cable is configured to become engaged at approximately the same time said support panel is no longer providing bending resistance.

* * * * *